(12) United States Patent
Williams et al.

(10) Patent No.: US 10,232,693 B1
(45) Date of Patent: Mar. 19, 2019

(54) WATER MANAGEMENT FOR A VEHICLE

(71) Applicant: Toyota Motor Engineering & Manufacturing North America, Inc., Erlanger, KY (US)

(72) Inventors: Paxton S. Williams, Milan, MI (US); Bryce M. Wassa, Ann Arbor, MI (US); Robert C. Day, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/711,010

(22) Filed: Sep. 21, 2017

(51) Int. Cl.
*B60J 10/00* (2016.01)
*B60J 10/25* (2016.01)
*B62D 25/04* (2006.01)

(52) U.S. Cl.
CPC .............. *B60J 10/25* (2016.02); *B62D 25/04* (2013.01)

(58) Field of Classification Search
CPC ........ B60J 10/0045; B60J 10/25; B62D 25/04
USPC ................................................. 296/208, 154
See application file for complete search history.

(56) References Cited

U.S. PATENT DOCUMENTS

| | | | |
|---|---|---|---|
| 4,492,405 A * | 1/1985 | Chikaraishi | B60J 5/06 296/146.9 |
| 4,494,790 A | 1/1985 | Omura | |
| 5,209,546 A * | 5/1993 | Hasegawa | B60J 7/022 296/154 |
| 6,443,519 B1 * | 9/2002 | Betzl | B60J 7/0084 296/146.9 |
| 2015/0015030 A1 | 1/2015 | Sasaki et al. | |

* cited by examiner

*Primary Examiner* — Dennis H Pedder
(74) *Attorney, Agent, or Firm* — Christopher G. Darrow; Darrow Mustafa PC

(57) ABSTRACT

A vehicle can include an A-pillar water management system. The system can include an inner body member of a vehicle. The system can include a channel member operatively connected to the inner body member. A channel can be defined at least partially by the channel member. The channel can open in a substantially vertically upward direction. The channel can have an open first end and a second end. The second end can be opposite the first end. The first end can be located closer to a front end of the vehicle than the second end. A seal, such as an A-pillar to front fender seal, can operatively engage the inner body member. The seal can extend in a substantially vertical direction. The channel can extend in a direction that is transverse to the seal. The channel can pass between the seal and the inner body member.

20 Claims, 4 Drawing Sheets

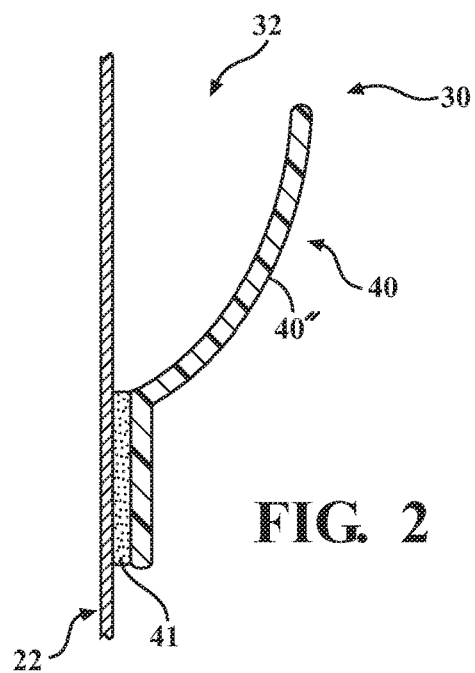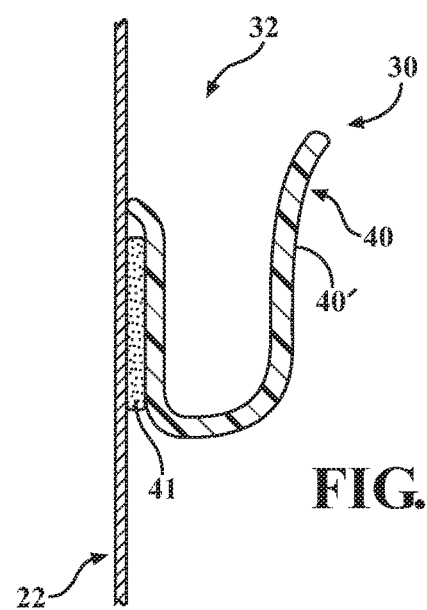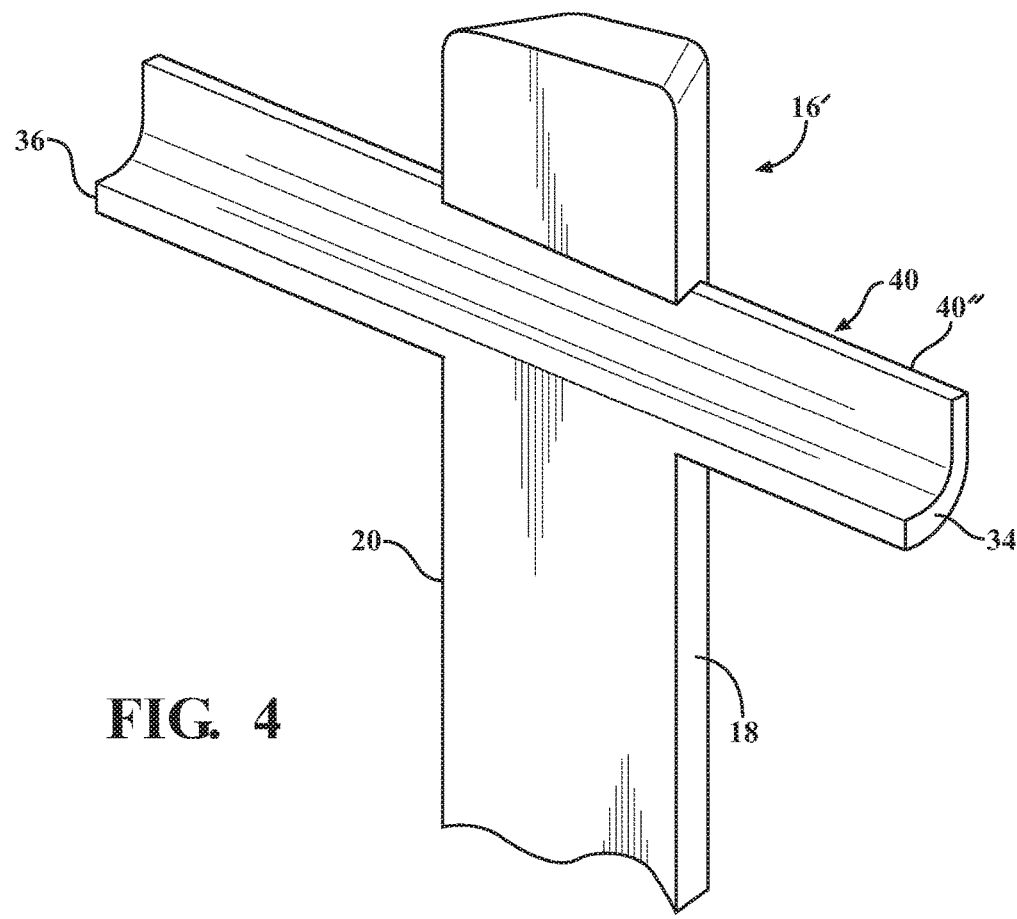

US 10,232,693 B1

WATER MANAGEMENT FOR A VEHICLE

FIELD

The subject matter described herein relates in general to vehicles and, more particularly, to the management of water that comes into contact with vehicles.

BACKGROUND

Vehicles are exposed to various environmental conditions over the course of their life. For example, vehicles may be exposed to water (e.g., during a rainstorm, while being cleaned, etc.) or other liquids. Vehicles can use seals or other elements to keep water or other liquids from infiltrating the interior of the vehicle and/or to divert water away from certain areas of the vehicle, or otherwise away from the vehicle itself. As an example, in some vehicles, water drainage from the A-pillar can enter the area of the front fender. A seal is used at the interface between a front fender and an A-pillar to prevent water from entering a front door opening area of the vehicle.

SUMMARY

In one respect, the subject matter presented herein is directed to a vehicle water management system. The system can include an inner body member of a vehicle. The system can include a channel member operatively connected to the inner body member. A channel can be defined at least partially by the channel member. The channel can open in a substantially vertically upward direction. The channel can have an open first end and a second end. The second end can be opposite the first end. The first end can be located closer to a front end of the vehicle than the second end. The system can include a seal operatively engaging the inner body member. The seal can extend in a substantially vertical direction. The channel can extend in a direction that is transverse to the seal. The channel can passing between the seal and the inner body member.

In another respect, the subject matter presented herein is directed to a vehicle water management system. The system can include an inner body member of a vehicle. At least a portion of the inner body member can be formed by an A-pillar of the vehicle. The system can include an outer body member of the vehicle. A space can be defined between the inner body member and the outer body member. The system can include a door pivotably attached to the vehicle by one or more hinges. The system can include a channel member operatively connected to the inner body member. A channel can be defined at least partially by the channel member. The channel can open in a substantially vertically upward direction. The channel can have an open first end and a second end. The second end can be opposite the first end. The first end can be located closer to a front end of the vehicle than the second end. The channel can be angled downwardly such that the first end of the channel is located below the second end of the channel in a vertical direction. The channel can be located vertically above the one or more hinges. The system can include an A-pillar to front fender seal operatively engaging the inner body member. The A-pillar to front fender seal can be located in the space defined between the inner body member and the outer body member. The A-pillar to front fender seal can extend in a substantially vertical direction. The channel can extend in a direction that is transverse to the A-pillar to front fender seal. The channel can passing between the A-pillar to front fender seal and the inner body member.

BRIEF DESCRIPTION OF THE DRAWINGS

FIG. 2 is a cross-sectional view of an example of the water management system, showing an example of a channel formed by a partial channel member.

FIG. 3 is a cross-sectional view of another example of the water management system, showing an example of a channel formed by a full channel member.

FIG. 4 is a view of an example of an A-pillar seal and a channel member formed as a unitary structure.

DETAILED DESCRIPTION

Figure 1:
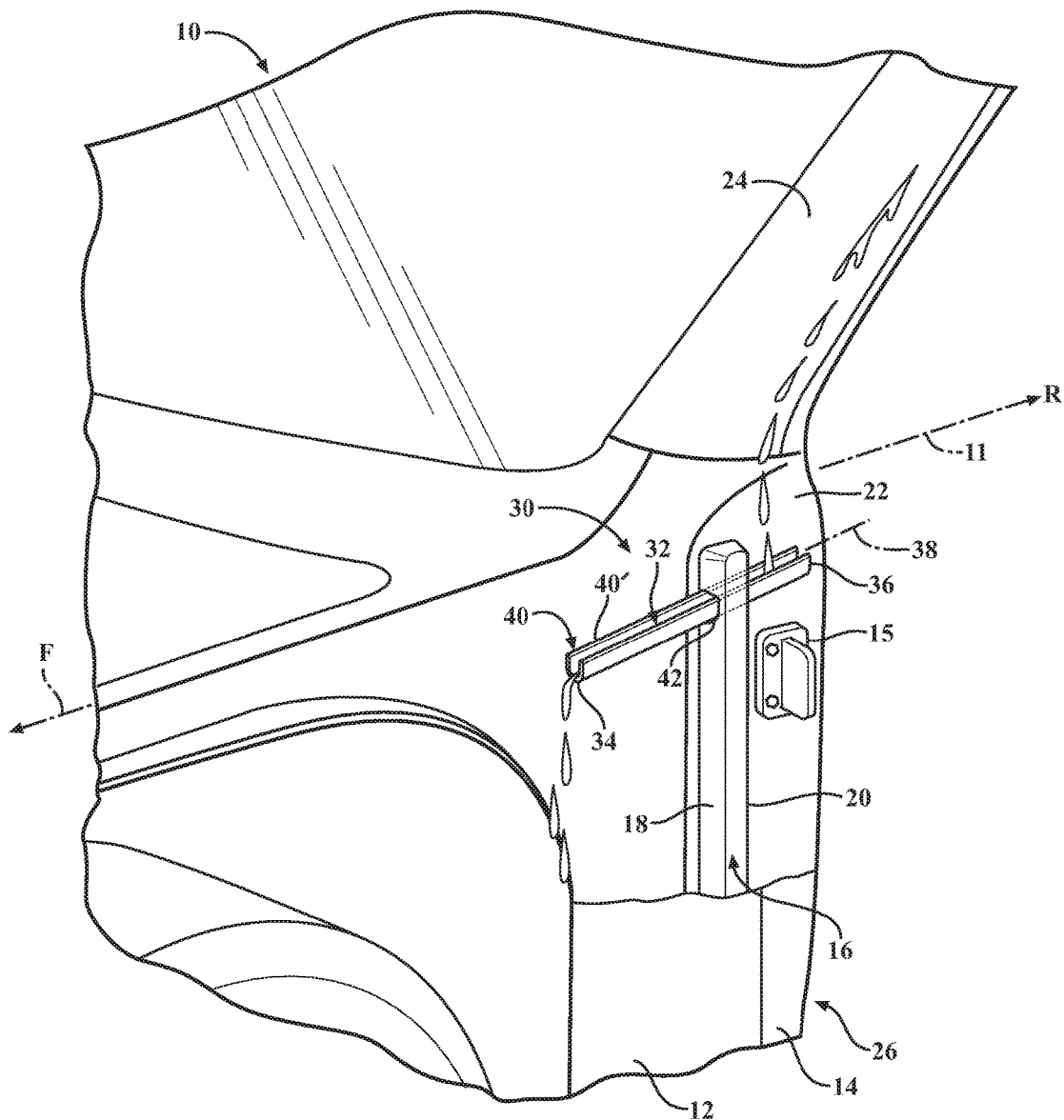
FIG. 1 is a view of a portion of a vehicle, showing an example of a water management system.

Despite the presence of a seal at the interface between a front fender and an A-pillar, water runoff from the A-pillar may still enter the area rearward side of the seal. Consequently, water may come into contact with the front door opening area and/or one or more of the front door hinges. In colder environments, this water can freeze and accumulate, which can adversely affect a person's ability to open/close the door freely.

According to arrangements herein, a vehicle can include a water management system. The system can include a channel defined at least partially by a channel member operatively connected to an inner body member (e.g., the A-pillar) of the vehicle. The channel can open in a substantially vertically upward direction to receive water (e.g., water from the A-pillar). The channel can have an open first end and a second end. The first end can be located closer to a front end of the vehicle than the second end. A seal, such as an A-pillar to front fender seal, can operatively engage the inner body member. The channel can pass between the seal and the inner body member. Water collected in the channel can be directed to the first end of the channel and can exit the channel on a forward side of the seal.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a portion of a vehicle 10 is shown. The vehicle 10 can include a forward end (generally represented by the letter F) and a rearward end (generally represented by the letter R). The vehicle 10 includes a front fender 12 and a door 14. For purposes of clarity, the majority of the front fender 12 and the door 14 are removed. The door 14 is pivotably attached to the vehicle 10 via one or more hinges 15. The vehicle 10 can include an A-pillar to front fender seal 16, which will be referred to herein as the A-pillar seal 16 for convenience. The A-pillar seal 16 can be generally located at an interface between the A-pillar and the front fender of the vehicle 10. The A-pillar seal 16 can have a forward side 18 and a rearward side 20, corresponding to a forward end and a rearward end of the vehicle 10. The A-pillar seal 16 can extend in a substantially vertical direction. The A-pillar seal 16 can be located in a space between one or more inner body members 22 (e.g., A-pillar 24 or other portion of the vehicle frame, chassis or body) and one or more outer body members 26 (e.g., door 14, front fender 12, and/or other body panel). The terms "inner" and "outer" are used herein for convenience and are not intended to be limiting. The inner body member 22 is a structure that does not define a portion of the outermost exterior of the vehicle 10. Thus, in at least some instances, a person standing on the outside of the vehicle 10 would generally not be able to see the inner body member 22 or would generally not be able to see at least a majority of the inner body member 22. The outer body member 26 is a structure that defines a portion of the outermost exterior of the vehicle 10. Thus, in at least some instances, a person standing on the outside of the vehicle 10 would generally be able to see the outer body member 26. The inner body member 22 is at least partially spaced from the outer body member 26.

The vehicle 10 can include an A-pillar water management system 30. Various examples of an A-pillar water management system 30 are shown in FIGS. 1-5. While arrangements described herein are described in connection with water management, it will be understood that arrangements described herein can be used with respect to any fluid, liquid, or other substance to which a vehicle may be exposed. Further, the various arrangements of the water management system are described herein in connection with the A-pillar of a vehicle, but it will be understood that these arrangements can be used in connection with other areas of the vehicle. Further, while the water management system is shown as being used on one side of the vehicle 10, it will be appreciated that it can be used on both sides of the vehicle 10.

The A-pillar water management system 30 can include a channel 32. The channel 32 can have a first end 34 and a second end 36. When installed on the vehicle 10, the first end 34 can be located closer to a forward end of the vehicle 10 than the second end 36. Thus, the first end 34 may be referred to herein as the forward end, and the second end 36 may be referred to herein as the rearward end. The first end 34 can be open. The second end 36 can be open or closed.

The channel 32 can have any suitable size and/or shape. In some or more arrangements, the channel 32 can have a cross-section shape that is substantially c-shaped, substantially u-shaped, or substantially v-shaped, just to name a few possibilities. The channel 32 can have a substantially symmetrical cross-sectional shape, or the channel 32 can have an asymmetrical cross-sectional shape. In one or more arrangements, the channel 32 can open in a generally vertically upward direction.

The cross-sectional size of the channel 32 can vary from vehicle to vehicle. Various factors can be taken into consideration in sizing the channel 32. For instance, the size of the channel 32 can be determined based on vehicle styling and/or an amount of water that the vehicle is expected to encounter.

In one or more arrangements, the channel 32 can extend in a substantially linear or straight manner. In one or more arrangements, the channel 32 can have one or more non-straight features, including, for example, one or more bends, curves, etc.

In one or more arrangements, the channel 32 can extend in a direction that is substantially parallel to a longitudinal axis 11 of the vehicle 10. As used herein, the term "substantially" includes exactly the term it modifies and slight variations therefrom. Thus, the term "substantially perpendicular" means exactly parallel and slight variations therefrom. In this particular example, slight variations therefrom can include within normal manufacturing tolerances, within about 10 degrees/percent or less, within about 5 degrees or less, within about 4 degrees/percent or less, within about 3 degrees/percent or less, within about 2 degrees/percent or less, or within about 1 degree/percent or less. Such slight variations can apply as appropriate to other terms herein that are modified by the term "substantially."

Figure 5:
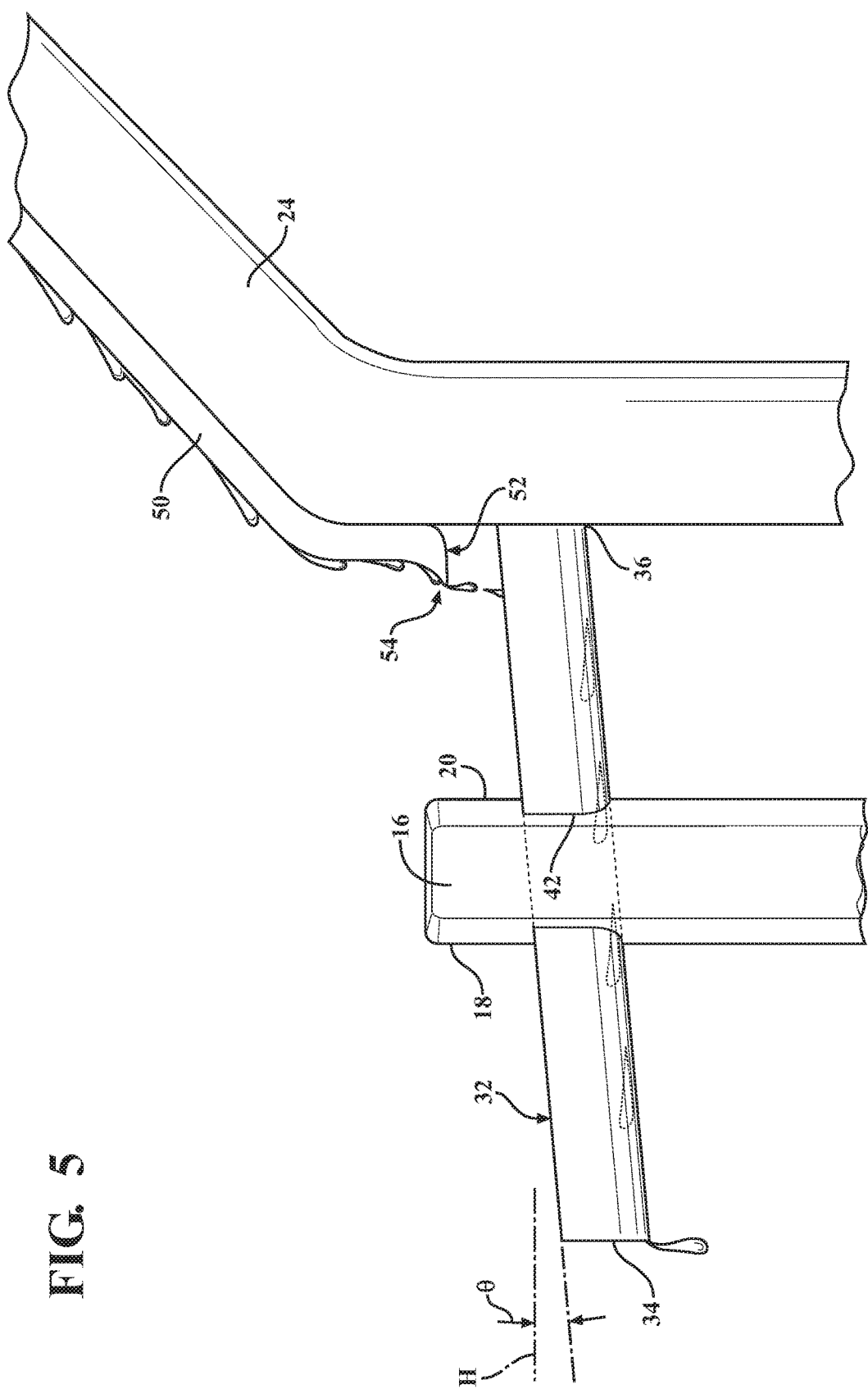
FIG. 5 is an example of the water management system in which the channel is positioned to receive water from another vehicle seal.

In its operational position, the channel 32 can have any suitable orientation. In one or more arrangements, the channel 32 can extend substantially horizontally. In one or more arrangements, the channel 32 can be oriented in a downward direction toward the forward end F of the vehicle 10. In such case, an angle $\theta$ can be formed between the channel 32 (or a longitudinal axis 38 (FIG. 1) of the channel 32) and a horizontal plane H, as is shown in FIG. 5. In one or more arrangements, the angle $\theta$ can be from about 1 degree to about 89 degrees relative to the horizontal plane H. In one or more arrangements, the angle $\theta$ can be about 1 degree or more, about 2 degrees or more, about 3 degrees or more, about 4 degrees or more, or about five degrees or more relative to the horizontal plane H. When oriented in such a manner, the first end 34 of the channel 32 can be located at a lower elevation than the second end 36. Such a downward angle of the channel 32 can help to ensure that water received in the channel 32 is directed forward of the A-pillar seal 16.

In one or more arrangements, the channel 32 can be defined at least in part by a channel member 40. In one or more arrangements, the channel member 40 can be a separate structure. The channel member 40 can be made of any suitable material. For example, the channel member 40 can be made of metal, plastic, rubber, or composite material. In one or more arrangements, the channel member 40 can be made of ethylene propylene diene monomer (EPDM) or Thermoplastic polyurethane (TPU), just to name a few possibilities. The channel member 40 can be made of the same material as the A-pillar seal 16, or they can be made of different materials.

In one or more arrangements, the channel member 40 can be a full channel member 40'. In such case, the channel 32 can be defined entirely by the channel member 40. An example of such an arrangement is shown in FIGS. 1 and 3. The full channel member 40' can be operatively connected to one or more vehicle components (e.g., one or more inner body members 22) in any suitable manner. The term "operatively connected," as used throughout this description, can include direct or indirect connections, including connections without direct physical contact. The full channel member 40' can be operatively connected to the one or more vehicle components by, for example, ones or more fasteners (bolts, clips, double-sided tape, etc.), one or more adhesives 41 (FIG. 3), one or more forms of bonding, one or more forms of mechanical engagement, welding, brazing, and/or combinations thereof, just to name a few possibilities. The full channel member 40' can have one or more surfaces configured to substantially matingly engage one or more surfaces of the vehicle component(s).

In one or more arrangements, the channel member 40 can be a partial channel member 40". In such case, the channel 32 can be collectively defined by the partial channel member 40" and a portion of one or more vehicle components (e.g., one or more inner body members 22) to which the partial channel member 40" is operatively connected. An example of such an arrangement is shown in FIG. 2. The partial channel member 40" can be operatively connected to one or more vehicle components (e.g., the A pillar and/or the front fender panel) in any suitable manner, including those described above. The partial channel member 40" can have one or more surfaces configured to substantially matingly engage one or more surfaces of the vehicle component(s).

In one or more arrangements, the channel member 40 (e.g., the full channel member 40' and/or the partial channel member 40") can be separate from the A-pillar seal 16, as is shown in FIGS. 1-3. In such case, a recess 42 (FIG. 1) can be formed in the A-pillar seal 16 to allow for passage of the channel member 40. The recess 42 can be formed in any suitable manner, such as by any material removal process and/or by molding the feature into the A-pillar seal 16. In some implementations, other than the inclusion of the recess 42, the A-pillar seal 16 can otherwise be the same as in prior designs. In some instances, the channel member 40 can include a through hole, extending from the rearward side 20 to the forward side of the A-pillar seal 16, to allow passage of the channel member 40.

When it is a separate element, the channel member 40 can be initially attached to the inner body member 22. Subsequently, the A-pillar seal 16 can be positioned such that at least a portion of the channel member 40 is received in the recess 42. The positioning of the A-pillar seal can be performed before or after an outer body member 26 is installed on the vehicle 10. In one or more arrangements, the A-pillar seal 16 may not be attached to other vehicle components at the interface using any additional attachment element. Instead, the A-pillar seal 16 can be held in place via frictional engagement with surrounding components (e.g., the inner body member(s) 22 and/or the outer body member(s) 26).

In one or more arrangements, the channel member 40 can be formed as an integrated, unitary structure with one or more components of the vehicle 10. For example, the channel member 40 can be formed as a unitary structure with the A-pillar seal 16. One example of such an integrated A-pillar seal 16' is shown in FIG. 4. In the particular arrangement shown, the channel member 40 is a partial channel member 40". However, it will be understood that the channel member 40 can be a full channel member 40'.

For the configuration shown in FIG. 4, the entire A-pillar seal 16' can be can be positioned such that the channel member 40 engages a surface of the inner body member 22. In some instances, one or more adhesives or fasteners can be applied to at least a portion of contacting surfaces of the channel member 40 and/or the inner body member 22.

Figure 6:
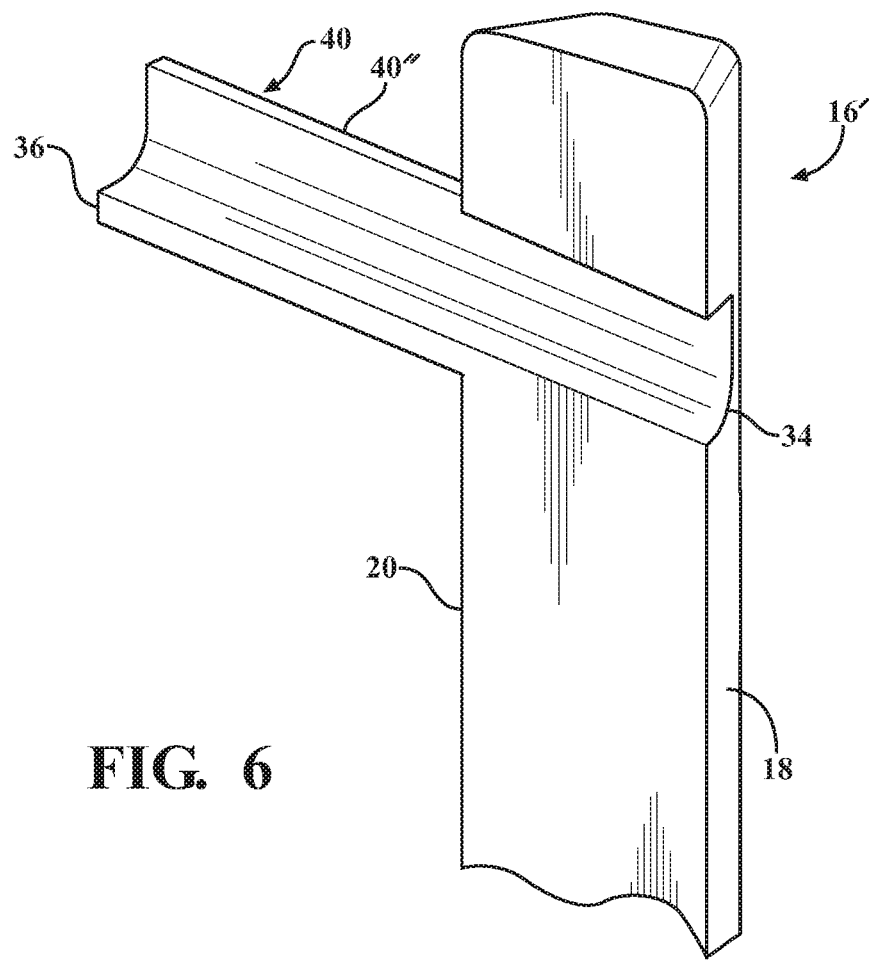
FIG. 6 is a view of an example of an A-pillar seal and a channel member formed as a unitary structure, showing the channel member substantially flush with a forward side of the A-pillar seal.

There can be any suitable relationship between the A-pillar seal 16 and the first end 34 and/or the second end 36 of the channel member 40. For instance, in one or more arrangements, the first end 34 of the channel member 40 can be substantially flush with the forward side 18 of the A-pillar seal 16, as is shown in FIG. 6. In one or more arrangements, the first end 34 of the channel member 40 can extend beyond the forward side 18 of the A-pillar seal 16, as is shown in FIG. 4. In one or more arrangements, the first end 34 of the channel member 40 can extend as far forward beyond the forward side 18 of the A-pillar seal 16 as possible. In one or more arrangements, the second end 36 of the channel member 40 can extend rearward beyond the rearward side 20 of the A-pillar seal 16. The second end 36 of the channel member 40 can extend as far beyond the rearward side 20 of the A-pillar seal 16 as possible to maximize water collection and redirection.

In one or more arrangements, at least a portion of the channel 32 can be located vertically above the hinge(s) 15. In one or more arrangements, the channel 32 can be located directly over at least a portion of the hinge(s) 15, as is shown in FIG. 1. In one or more arrangements, the channel 32 can be located directly over all of the hinge(s) 15 for the door 14. In this way, the channel 32 can help to ensure that water does not reach the hinge(s) 15. However, it should be noted that, in one or more arrangements, the channel 32 can be located vertically below the hinge(s) 15.

In use, the exterior of the vehicle 10 can be exposed to water, such as when the vehicle 10 is being operated in the rain. Water impinging upon the roof, windshield, windshield cowl, and/or hood can flow down the A-pillar 24 toward front fender 12. The water can be received in the upward opening of the channel 32. The channel 32 can redirect the water downwardly and toward the forward end F of the vehicle 10. The water can exit the channel 32 through the first end 34 thereof. From there, the water can drain to the ground. Notably, the flow path of the water avoids the hinge(s) 15 and the area located behind the rearward side 20 of the A-pillar seal 16.

The channel 32 can have various relationships with one or more other components in the area. For instance, the second end 36 of the channel 32 can be positioned to receive water from another vehicle seal. For example, referring to FIG. 5, the second end 36 of the channel 32 can be positioned to receive water runoff from a weather strip 50 associated with the A-pillar 24. In one or more arrangements, the channel 32 can be located vertically below the weather strip 50, as is shown in FIG. 5. The channel 32 can be located directly below the weather strip 50. There can be any suitable spacing between the channel 32 and the weather strip 50 in the vertical direction. The channel 32 can open in the vertically upward direction to receive water from the weather strip 50. In one or more arrangements, the second end 36 of the channel 32 can abut a portion of the weather strip 50. In one or more arrangements, the weather strip 50 can include one or more features to facilitate the flow of water off of the weather strip 50 and into the channel 32. For instance, an end 52 of the weather strip 50 can include a lip 54. In such case, water can flow along the weather strip 50 until it reaches the end 52. The water can drain from the weather strip 50 by gravity. The separation of the water from the weather strip 50 can be facilitated by the lip 54.

It will be appreciated that arrangements described herein can provide numerous benefits, including one or more of the benefits mentioned herein. For example, arrangements described herein can facilitate the collection and redirection of water to the forward side of the fender to A-pillar seal.

Arrangements described herein can prevent water from entering and accumulating at the base of the door opening area. Arrangements described herein can prevent water from coming into contact with one or more hinges for a vehicle door. Arrangements described herein can, in cold environments, prevent such water from freezing, which can ensure that the vehicle door can open and/or close freely.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle water management system, comprising:
    an inner body member of a vehicle;
    a channel member operatively connected to the inner body member;
    a channel defined at least partially by the channel member, the channel opening in a substantially vertically upward direction, the channel having an open first end and a second end, the second end being opposite the first end, the first end being located closer to a front end of the vehicle than the second end; and
    a seal, the seal and the channel member operatively engaging the inner body member, the seal extending in a substantially vertical direction, the channel extending in a direction that is transverse to the seal, the channel passing between the seal and the inner body member.

2. A vehicle water management system, comprising:
    an inner body member of a vehicle, the inner body member being an A-pillar;
    a channel member operatively connected to the inner body member;
    a channel defined at least partially by the channel member, the channel opening in a substantially vertically upward direction, the channel having an open first end and a second end, the second end being opposite the first end, the first end being located closer to a front end of the vehicle than the second end; and
    a seal operatively engaging the inner body member, the seal being an A-pillar to front fender seal, the seal extending in a substantially vertical direction, the channel extending in a direction that is transverse to the seal, the channel passing between the seal and the inner body member.

3. The vehicle water management system of claim 1, wherein the channel is angled downwardly such that the first end of the channel is located below the second end of the channel in a vertical direction.

4. The vehicle water management system of claim 1, wherein the channel is angled downwardly at about 3 degrees or more relative to horizontal.

5. The vehicle water management system of claim 1, wherein the channel is located vertically above one or more door hinges of the vehicle.

6. The vehicle water management system of claim 1, wherein the channel is defined by a separate channel member, whereby the channel member is separate from the seal and the inner body member.

7. The vehicle water management system of claim 6, wherein the seal includes a recess opening toward the inner body member, and wherein a portion of the channel member is received in the recess, whereby the recess allows the channel member to pass between the seal and the inner body member.

8. The vehicle water management system of claim 1, wherein the channel member is a partial channel member, and wherein the channel is collectively defined by the partial channel member and a portion of the inner body member.

9. A vehicle water management system, comprising:
    an inner body member of a vehicle;
    a channel member operatively connected to the inner body member;
    a channel defined at least partially by the channel member, the channel opening in a substantially vertically upward direction, the channel having an open first end and a second end, the second end being opposite the first end, the first end being located closer to a front end of the vehicle than the second end; and
    a seal operatively engaging the inner body member, the seal extending in a substantially vertical direction, the channel extending in a direction that is transverse to the seal, the channel passing between the seal and the inner body member, the channel member being formed together with the seal as a unitary structure.

10. The vehicle water management system of claim 1, wherein the seal includes a forward side and a rearward side, wherein the forward side is located closer to a front end of the vehicle than the rearward side, and wherein the first end of the channel is substantially flush with a forward side of seal.

11. The vehicle water management system of claim 1, wherein the seal includes a forward side and a rearward side, wherein the forward side is located closer to a front end of the vehicle than the rearward side, and wherein the first end of the channel extends beyond the forward side of the seal.

12. The vehicle water management system of claim 1, wherein the seal includes a forward side and a rearward side, wherein the forward side is located closer to a front end of the vehicle than the rearward side, and wherein the second end of the channel extends beyond the rearward side of the seal.

13. A vehicle water management system, comprising:
    an inner body member of a vehicle;
    a channel member operatively connected to the inner body member;
    a channel defined at least partially by the channel member, the channel opening in a substantially vertically upward direction, the channel having an open first end and a second end, the second end being opposite the first end, the first end being located closer to a front end of the vehicle than the second end;
    a seal operatively engaging the inner body member, the seal extending in a substantially vertical direction, the channel extending in a direction that is transverse to the seal, the channel passing between the seal and the inner body member; and
    a weather strip, the weather strip including an end, the channel being positioned to receive water from the end of the weather strip.

14. The vehicle water management system of claim 13, wherein the end of the weather strip includes a lip, whereby the flow of water into the channel from the weather strip is facilitated.

15. The vehicle water management system of claim 1, wherein the channel has a cross-sectional shape, and wherein the cross-sectional shape of the channel is one of: substantially u-shaped, substantially c-shaped, or substantially v-shaped.

16. An A-pillar water management system for a vehicle, comprising:
   an inner body member of a vehicle, at least a portion of the inner body member being formed by an A-pillar of the vehicle;
   an outer body member of the vehicle, a space being defined between the inner body member and the outer body member;
   a door pivotably attached to the vehicle by one or more hinges;
   a channel member operatively connected to the inner body member;
   a channel defined at least partially by the channel member, the channel opening in a substantially vertically upward direction, the channel having an open first end and a second end, the second end being opposite the first end, the first end being located closer to a front end of the vehicle than the second end, the channel being angled downwardly such that the first end of the channel is located below the second end of the channel in a vertical direction, the channel being located vertically above the one or more hinges; and
   an A-pillar to front fender seal operatively engaging the inner body member, the A-pillar to front fender seal being located in the space defined between the inner body member and the outer body member, the A-pillar to front fender seal extending in a substantially vertical direction, the channel extending in a direction that is transverse to the A-pillar to front fender seal, the channel passing between the A-pillar to front fender seal and the inner body member.

17. The A-pillar water management system of claim 16, wherein the channel is defined by a separate channel member, wherein the A-pillar to front fender seal includes a recess opening toward the inner body member, and wherein a portion of the channel member is received in the recess, whereby the recess allows the channel member to pass between the A-pillar to front fender seal and the inner body member.

18. The A-pillar water management system of claim 16, wherein the channel member is a partial channel member, and wherein the channel is collectively defined by the partial channel member and a portion of the inner body member.

19. The A-pillar water management system of claim 16, wherein the channel member is formed together with the A-pillar to front fender seal as a unitary structure.

20. The A-pillar water management system of claim 16, further including a weather strip, the weather strip including an end, wherein the channel is positioned to receive water from the end of the weather strip.

* * * * *